Patented Oct. 7, 1930

1,777,352

UNITED STATES PATENT OFFICE

CECIL JOHN TURRELL CRONSHAW AND WILLIAM JOHNSON SMITH NAUNTON, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF VULCANIZED RUBBER AND OF MATERIALS FOR USE THEREIN

No Drawing. Application filed August 15, 1927, Serial No. 213,218, and in Great Britain September 3, 1926.

Condensation products with various amines are useful accelerators in the vulcanization of rubber. Those given by each of the two naphthylamines, the alpha and the beta bodies, have no accelerating properties worth while nor have they individually, so far as our experience shows, any other properties likely to render them valuable in the rubber art. But, rather unexpectedly, we have found the product of the co-condensation of these two amines with aldehydes to have substantial value as a retardant of the decrease in the tensile strength of rubber with age. Neither amine separately condensed exhibits this property to a degree worth while but the co-condensation product does.

We have found by experiment that neither the condensation product from acetaldehyde and α-naphthylamine, nor that from acetaldehyde and β-naphthylamine has any substantial accelerating influence in the vulcanization of rubber, and neither has any great effect on the decrease of tensile strength of rubber vulcanized with their use when it is heated in a current of dry air. Thus, a mix consisting of:—

|  | Parts by weight |
|---|---|
| Smoked sheet | 45 |
| Floating reclaim | 30 |
| Mineral rubber | 3 |
| Zinc oxide | 10 |
| Gas black | 10 |
| Sulphur | 2 |
| Diphenylguanidine | 0.3 | was cured for 45 minutes at 141° C., and was found to have a tensile strength of 145 kilos. per square centimetre, which fell to 30 kilos. per sq. cm. after treating for three weeks at 70–75° C. in a current of dry air.

Two mixes of the same ingredients in the same proportions as the foregoing were made and tested, one having an addition of 1.2 parts of the condensation product of acetaldehyde with alpha-naphthyl-amine and the other an addition of 1.2 parts of the condensation product of acetaldehyde with beta-naphthylamine. Both showed a decrease in tensile strength on ageing as above—one to 60 kilos. per square centimeter and the other to 50.

But we have found that a condensation product from a mixture of equal proportions of α- and β-naphthylamines with acetaldehyde can be prepared, and this new body has a most surprising effect on the ageing property of rubber vulcanized with a little of this new body added. Thus an experiment under identical conditions with those described in the above three cases, but using the new condensation product, gave a vulcanized rubber which had on curing a tensile strength of 140 kilos. per sq. cm. and after ageing side by side with the other vulcanizates under the same conditions, this retained a tensile strength of 125 kilos. per sq. cm.

A product that can be obtained in a similar manner but using formaldehyde instead of acetaldehyde, does not appear to be analogously constituted to our new acetaldehyde condensation product and has not the valuable properties of our new product.

The following examples will serve to illustrate the nature of our invention without limiting it. The parts are by weight.

*Example I.*—Production of the new condensation product from acetaldehyde and α- and β-napthylamines.

A finely ground mixture of 72.5 parts of α-naphthylamine and 72.5 parts of β-naphthylamine is suspended in 1500 parts of 3.65 per cent hydrochloric acid and stirred vigorously in a closed vessel fitted with a reflux condenser. 66 parts of acetaldehyde are then added and the mixture is stirred for about half an hour, being cooled as required.

The reaction mixture is now partially neutralized by addition of about 1350 parts of 4 per cent caustic soda solution. The precipitated product is filtered off, washed and dried.

This product is a brown powder, soluble in methylated spirits and partly soluble in toluene. It is completely soluble in a mixture of toluene and alcohol and is also soluble in dilute sulphuric acid and in hot stearic acid. It decolorizes a warm solution of potassium permanganate.

*Example II.*—Production of vulcanized rubber of good ageing properties by the use of the product of Example I.

To a mix consisting of 45 parts of smoked sheet, 30 parts of floating reclaim, 3 parts of mineral rubber, 10 parts of zinc oxide, 10 parts of gas black and 2 parts of sulphur, with 0.3 parts of diphenylguanidine as accelerator, are added 1.2 parts of the product prepared as in Example I. The whole is cured for 45 minutes at 141° C. in the usual manner.

What we claim and desire to secure by Letters Patent is:

1. In the production of age-resistant rubber, the step which comprises condensing with acetaldehyde a mixture of equal parts of alpha-naphthylamine and beta-naphthylamine in the presence of acid as a condensing agent, removing the acid and isolating the product, the said product being a brown powder, soluble in methylated spirits, partly soluble in toluene, completely soluble in a mixture of toluene and alcohol, soluble in dilute sulphuric acid and in hot stearic acid, and decolorizing a warm solution of potassium permanganate.

2. In the production of age-resistant rubber, the process which comprises condensing with acetaldehyde a mixture of equal parts of alpha-naphthylamine and beta-naphthylamine in the presence of acid as a condensing agent, removing the acid, isolating the product, adding to a rubber mix in small proportions and vulcanizing the mix.

3. As a new composition useful in retarding the ageing of rubber, a condensation product of acetaldehyde with a mixture of alpha-naphthylamine and beta-naphthylamine in the presence of acid, the said condensation product being a brown powder, soluble in methylated spirits, partly soluble in toluene, completely soluble in a mixture of toluene and alcohol, soluble in dilute sulphuric acid and in hot stearic acid and decolorizing a warm solution of potassium permanganate.

4. In age-resistant rubber, a rubber mix containing a condensation product of acetaldehyde with a mixture of alpha-naphthylamine and beta-naphthylamine in the presence of acid.

In testimony whereof we affix our signatures.

CECIL JOHN TURRELL CRONSHAW.
WILLIAM JOHNSON SMITH NAUNTON.